United States Patent
Roddis (10) Patent No.: US 7,029,012 B2
(45) Date of Patent: Apr. 18, 2006

(54) MECHANICAL SEAL WITHOUT ELASTOMERS

(75) Inventor: Alan James Roddis, Sheffield (GB)

(73) Assignee: AES Engineering Ltd., Rotherham (GB)

( * ) Notice: Subject to any disclaimer, the term of this patent is extended or adjusted under 35 U.S.C. 154(b) by 0 days.

(21) Appl. No.: 10/471,158

(22) PCT Filed: Mar. 8, 2002

(86) PCT No.: PCT/GB02/00949

§ 371 (c)(1),
(2), (4) Date: Mar. 12, 2004

(87) PCT Pub. No.: WO03/014602

PCT Pub. Date: Feb. 20, 2003

(65) Prior Publication Data
US 2005/0077684 A1 Apr. 14, 2005

(30) Foreign Application Priority Data
Aug. 3, 2001 (GB) .................................. 0105715

(51) Int. Cl.
F16J 15/34 (2006.01)

(52) U.S. Cl. .................... 277/370; 277/371; 277/390; 277/396; 277/397

(58) Field of Classification Search ........ 277/366–367, 277/370–371, 390, 500, 392, 396–397, 518, 277/511, 520
See application file for complete search history.

(56) References Cited

U.S. PATENT DOCUMENTS

| 2,770,477 | A | * | 11/1956 | Rankin | 277/397 |
| 3,162,452 | A | * | 12/1964 | Tankus | 277/396 |
| 3,655,206 | A | * | 4/1972 | Adams | 277/396 |
| 4,462,568 | A | * | 7/1984 | Taylor et al. | 251/335.2 |
| 4,973,065 | A | * | 11/1990 | Habich | 277/399 |
| 5,489,105 | A | * | 2/1996 | Attenasio et al. | 277/370 |
| 5,577,738 | A | * | 11/1996 | Fukuda | 277/370 |
| 5,794,939 | A | * | 8/1998 | Parkin | 277/357 |
| 5,823,539 | A | * | 10/1998 | Rockwood | 277/390 |
| 6,522,708 | B1 | * | 2/2003 | Martin et al. | 376/204 |

FOREIGN PATENT DOCUMENTS

| DE | 518711 C | 2/1931 |
| DE | 1241210 B | 5/1967 |
| JP | 04004365 | 4/1992 |
| WO | WO 01/31238 A1 | 5/2001 |

OTHER PUBLICATIONS

International Search Report for PCT/GB02/00949, Jul. 12, 2002.

* cited by examiner

*Primary Examiner*—Vishal Patel
(74) *Attorney, Agent, or Firm*—Myers Bigel Sibley & Sajovec, P.A.

(57) ABSTRACT

A seal that provides sealing between a rotatable shaft and a housing has a stationary part for connection to the housing and a rotary part for rotation with the shaft. The rotary part includes a sleeve for mounting on the shaft. One end of the sleeve is provided with a non-elastometric sealing arrangement. The sealing arrangement has sealing surfaces for contacting outer circumferential surfaces of the sleeve and the shaft as well as means for effecting sealing engagement between each of said sleeve and said shaft and a respective sealing surface.

8 Claims, 9 Drawing Sheets

MECHANICAL SEAL WITHOUT ELASTOMERS

RELATED APPLICATIONS

The present application is a 35 U.S.C. §371 national phase application of PCT International Application No. PCT/GB02/00949, having an international filing date of Mar. 8, 2002, and claiming priority to Great Britain Patent Application No. 0105715.7, filed Aug. 3, 2001, the disclosure of which is incorporated herein by reference in their entireties. The above PCT International Application was published in the English language and has International Publication No. WO 03/014602 A1.

BACKGROUND OF THE INVENTION

This invention relates to mechanical seals and especially cartridge mechanical seals which use compressed packing materials and not elastomers to create secondary sealing points.

A Mechanical seal comprises a "floating" component which is mounted axially movably around the rotary shaft of, for example, a pump and a "static" component which is axially fixed, typically being secured to a housing. The floating component has a flat annular end face, i.e. its seal face, directed towards a complementary seal face of the static component. The floating component is urged towards the static component to close the seal faces together to form a sliding face seal, usually by means of one or more spring members. In use, one of the floating and static components rotates; this component is therefore referred to as the rotary component. The other of the floating and static components does not rotate and is referred to as the stationary component.

Those seals whose floating component is rotary are described as rotary seals. If the floating component is stationary, the seal is referred to as a stationary seal.

If the sliding seal between the Rotary and Stationary components are assembled and pre-set prior to despatch from the Mechanical seal manufacturing premises, the industry terminology for this is "cartridge seal". If the Rotary and Stationary components are despatched individually (unassembled) form the Mechanical Seal manufacturing premises, the industry terminology for this is "component seal".

Mechanical seals often include elastomeric members to seal static and semi-dynamic surfaces. In certain seal designs such elastomeric members may be replaced with packing materials, which form a compression seal between two or more surfaces.

For the clarity of this invention the term elastomer may be thought of as on o-ring, lip seal, wiper seal or a similar component which has an elastomeric membrane or structure. Likewise, a packing material may be thought of as graphite, PTFE or a material, which may be compressed, often to change its density, to create a seal between two or more surfaces. Such materials are considered to have no, or very little elastomeric membrane.

Mechanical seals are used in all types of industries to seal a variety of different process media and operating conditions.

Such operating conditions range for high temperatures, pressures or particularly aggressive chemicals. In such cases it is imperative that the correct selection of materials, used in the mechanical seal construction, is made.

Elastomers are often the weakest link in the mechanical seal construction. This is due to the fact that they need to be chemically compatible with the sealed media and withstand various operating conditions. Furthermore, elastomers often degrade when subjected to high/low temperatures or pressures. This often limits the mechanical seal life.

SUMMARY OF THE INVENTION

It is considered to be particularly advantageous to create a mechanical seal design with no elastomeric sealing members. This removes the weakest link thereby helping to extend seal live.

Figure 1:
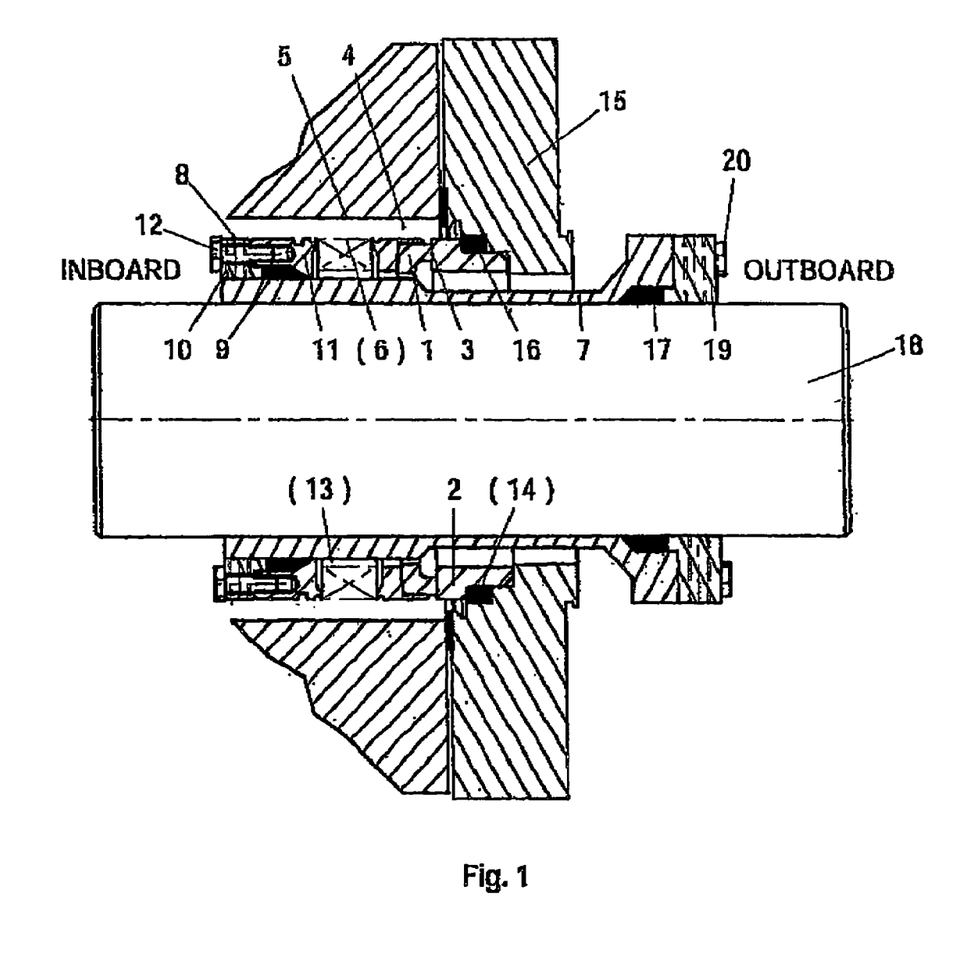

It is also considered extremely advantageous to create a mechanical seal design with no elastomeric sealing members that will physically fit inside a small radial cross sectional space in a cartridge seal format. A prior art single cartridge mechanical seal design, which removes the elastomeric sealing member, is shown in FIG. 1.

The rotary and axially floating seal face (1) is spring biased towards a static stationary seal face (2). The rotary face (1) is allowed to slide on the static seal face (2). The interface between the rotary seal face (1) and stationary seal face (2) forms sealing area (3). This sealing area (3) is the primary seal that prevents the process media (4) from escaping from the process chamber (5).

At the process side of the deal, denoted as inboard, the detachable removable rotary seal assembly (6) is secured to a sleeve (7) with screws (8). A compression packing seal (9) is formed between the clamp ring (10) and rotary seal face drive end (11) using screws (12). The rotary seal assembly (6), screws (8 and 12), packing (9) and clamp ring (10) from the detachable assembly (13). From FIG. 1 this detachable assembly (13) is fitted to the mechanical seal from the left-hand side due to the radially outwardly extending portion of sleeve (7) on the outboard side. The rotary compression packing (9) creates the first of three secondary sealing areas.

The second secondary sealing area (14) is formed between stationary seal face (2) and stationary gland (15) using a gland compression packing (16). The gland packing (16) is compressed in place by the spring bias of the rotary seal assembly (6) and by the hydraulic force established from the process media (4) pressure.

At atmospheric side of the seal, denoted as outboard, the sleeve (7) increases radially to accommodate a sleeve compression packing (17). The packing (17) is compressed to the shaft (18) by the clamp ring (19) and screws (20) to from the third secondary sealing area.

Form FIG. 1 it is evident that when radial screws (8) are secured to sleeve (7), the sleeve (7) will radially deform. This creates assembly difficulties. The deformation can be limited it the radial cross section of the sleeve (7) is increased as shown in FIG. 1.

A large proportion of standard process equipment is designed with either a 0.3125" (8 mm), 0.375" (10 mm) or 0.500" (12 mm) radial cross section between the shaft (18) and the process chamber (5), depending on the shaft diameter. Radially increasing the cartridge sleeve (7) as shown in FIG. 1 limits where the design can be physically applied.

The materials used in the design shown in FIG. 1 also suffer from chemical attack problems since the screws (8) and (12) are sited in the process media. This could limit seal life and make the design commercially impractical as exotic alloy screw materials are not commonly available.

It is therefore considered that a seal design which removes the screws (8) and (12) out of the process media, removes all elastomeric sealing members and is offered to fit inside a radially small cross sectional inboard opening is deemed considerably advantageous.

BRIEF DESCRIPTION OF THE DRAWINGS

From FIG. 1, the screws (8) and (12) could be eliminated by a leak tight, permanent joint fixing the clamp ring (10) to the sleeve (7) and rotary seal face drive end (11). However as the sleeve (7) increases radially on the outboard side to cater for the shaft packing (17) this would mean that the design could not be assembled or disassembled for seal repair. The seal features described above are therefore not possible to accommodate with the existing prior art technology.

The present invention is described by way of example only with reference to the accompanying drawings, in which.

DETAILED DESCRIPTION OF EMBODIMENTS

Figure 2:
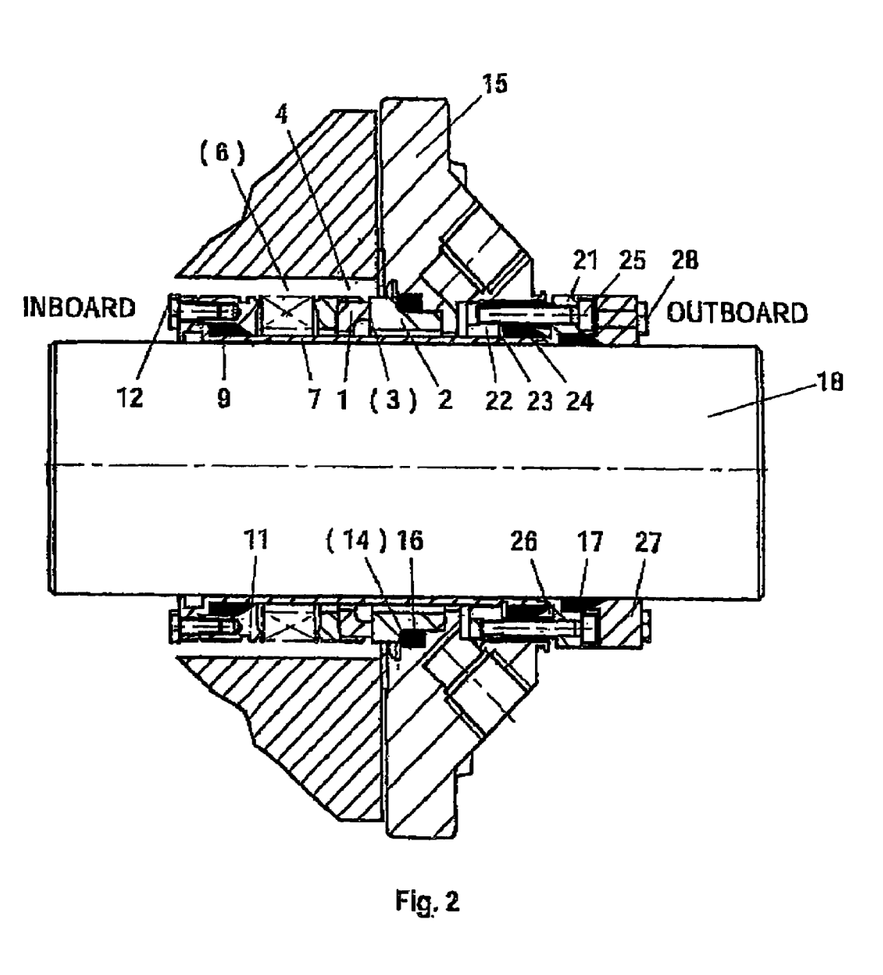
FIG. 2. is a longitudinal cross section through a mechanical seal of the invention.

From FIG. 2, of the invention the rotary and axially floating seal face (1) is spring biased towards a static stationary seal face (2). The rotary face (1) is allowed to slide an the static seal face (2). The interface between the rotary seal face (1) and stationary seal face (2) forms sealing area (3). This sealing area (3) is the primary seal that prevents the process media (4) from escaping from the process chamber (5).

At the process media (4) side of the seal, denoted as inboard, the detachable removable rotary seal assembly (6) is secured to a sleeve (7) with screws (12). A compression packing seal (9) is formed between the sleeve (7) and rotary seal face drive end (11) using screws (12). The rotary compression packing (9) creates the first of four secondary sealing areas.

The second secondary sealing area (14) is formed between stationary seal face (2) and stationary gland (15) using a gland compression packing (16). The gland packing (16) is compressed in place by the spring bias of the rotary seal assembly (6) and by the hydraulic force established form the process media (4) pressure.

At atmospheric side of the seal, denoted as outboard, the sleeve (7) is terminated adjacent to the drive ring (21). A draw ring (22) located radially outwardly of sleeve (7) is axially restrained by a circlip (23). The compression packing (24) is located radially outwardly of sleeve (7) and is compressed between the draw ring (22), spacer ring (26) and drive ring (21) using screws (25). The separate spacer ring (26) is used to facilitate component manufacture. It is considered self evident that this could be omitted if the profile of the spacer ring (26) is machined into the drive ring (21) to accommodate the angle on the packing member (24).

The clamp ring (27) compresses the shaft packing (17) when it is secured to the drive ring (21) using screws (28).

The invention illustrated in FIG. 2 therefore offers a cartridge mechanical seal with no elastomeric members which will fit into small radial cross sections. This is seen as a major advantage.

Figure 3:
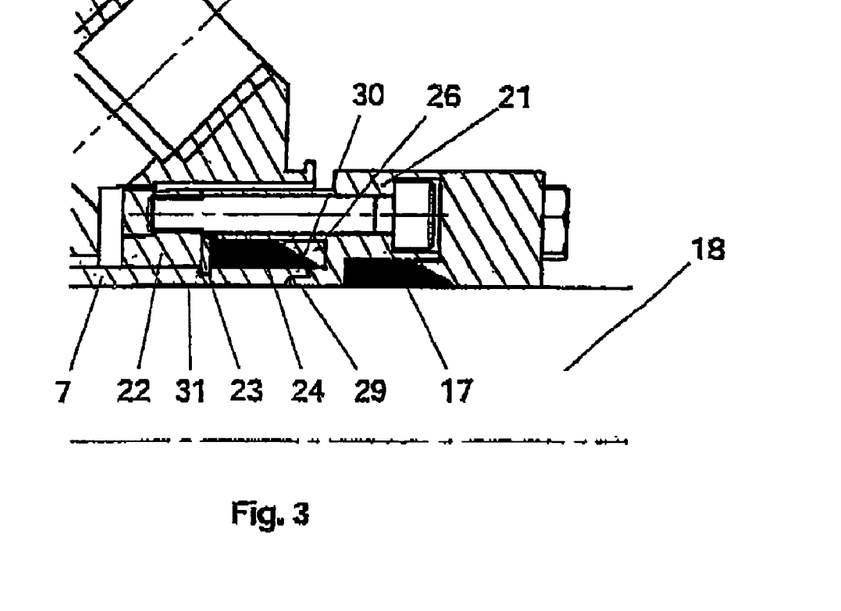
FIG. 3 corresponds to FIG. 2 and is an enlarged partial longitudinal cross section through a mechanical seal of the invention.

From FIG. 3 it should be noted that the drive ring (21) has a radial support lip (29) that locates into the recess (30) in sleeve (7). As the packing (24) is compressed it exerts a radial force on the end of the sleeve (7). The support lip (29) in drive ring (21) supports the end of the sleeve (7) helping to prevent sleeve (7) distortion.

The process media (4) is allowed enter the radial gap (31) between the sleeve (7) and shaft (18). The process media (4) is sealed by packing members (24 and 17). There are no other un-sealed joints, between the respective outboard parts, where the process media (4) contacts.

Figure 4:
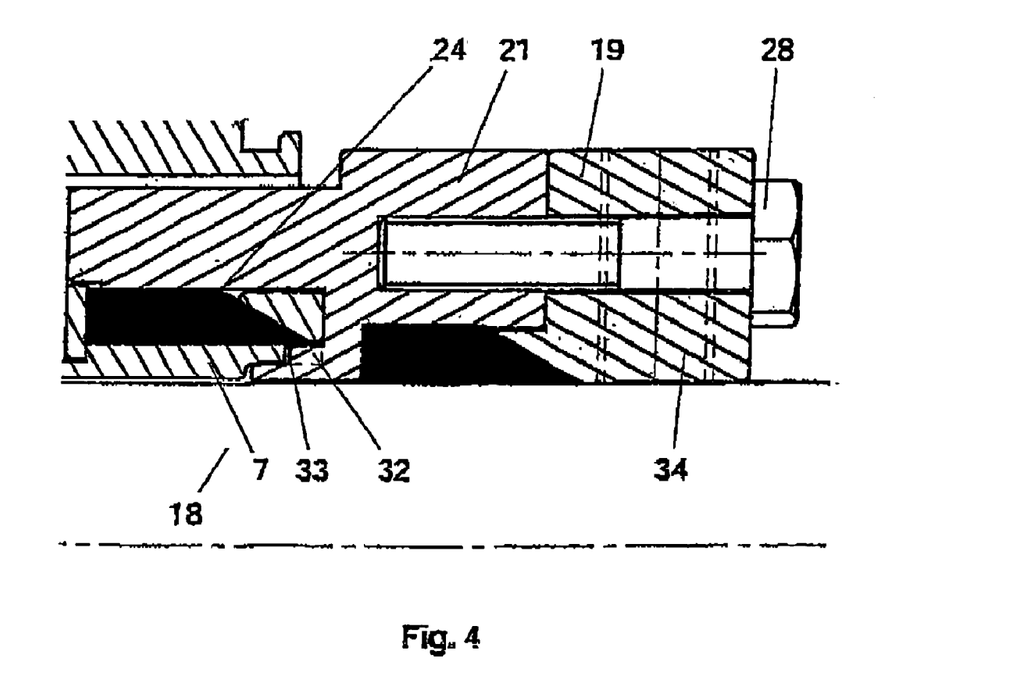
FIG. 4 corresponds to FIG. 3 and is an enlarged partial longitudinal cross section through the outboard side of a mechanical seal of the invention.

FIG. 4 illustrates the drive lug (32) in the drive (21) which locates into corresponding slots (33) in sleeve (7). Rotational drive from the shaft (18) is transmitted via the redial screws (34) located in the clamp ring (19) through the screws (28) into the drive ring (21) through the drive lugs (32) into the sleeve (7), and then into the rotary seal assembly (6) via the screws (12).

This positive drive mechanism is thought to be particularly advantageous in certain applications. Furthermore, the arrangement of the drive acting in the end of the sleeve (7) ensures that the thin cartridge sleeve (7) is not weakened by the introduction of radial slots away from the packing ling area (24).

Figure 5:
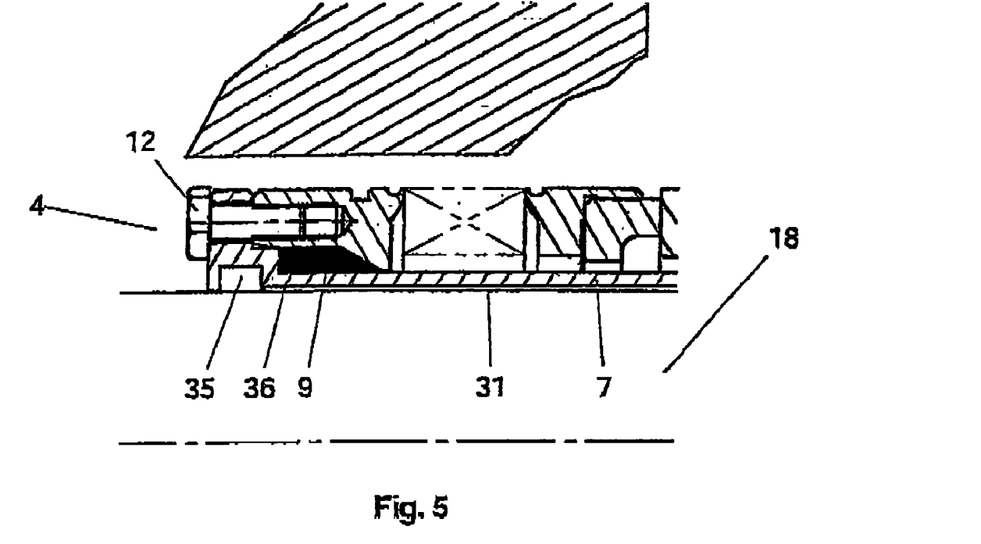
FIG. 5 corresponds to FIG. 3 and is an enlarged partial longitudinal cross section through the inboard side of a mechanical seal of the invention.

Referring to FIG. 5, it should be noted that sleeve (7) has an elastomer groove (35) positioned at the inboard side in contact with the process media (4). This allows a sacrificial component to be installed into groove (35), if the application dictates. This helps to eliminate the possibility of process media (4) contamination in radial gap (31), therefore assisting the removal of the cartridge mechanical seal from the shaft (18).

FIG. 5 also illustrates a relief (36) extending radially outwardly in the bore of the sleeve (7). Said relief is positioned in the vicinity of the packing member (9). Any radial sleeve (7) deformation occurred when compressing packing member (9) using screws (12) is accommodated by the relief (36). This is of particular importance when using packing (9) acting on a thin cross section cartridge sleeve (7).

Figure 6:
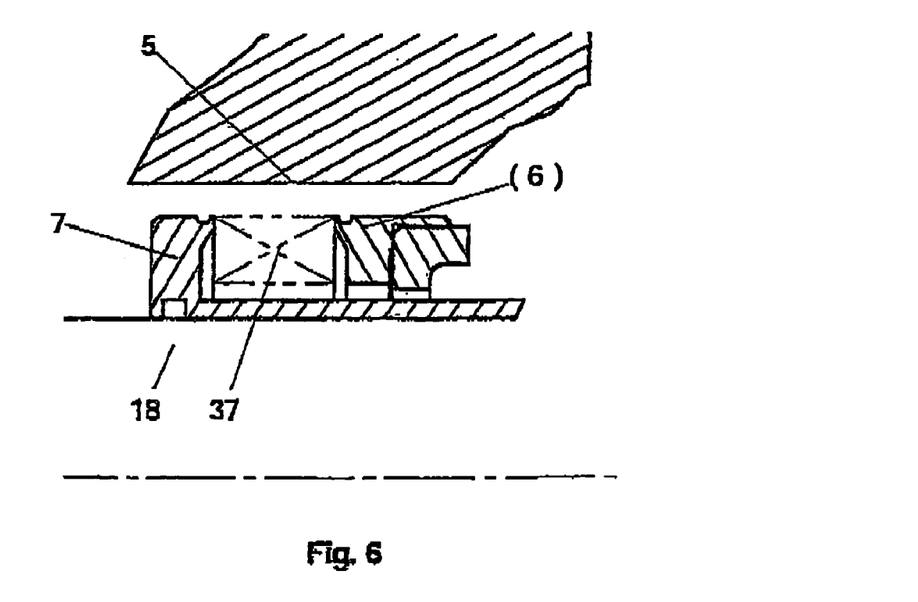
FIG. 6 shows an enlarged partial longitudinal cross section of an alternate inboard arrangement of the invention with a non-detachable inboard seal face assembly.

From FIG. 6 an alternate arrangement of the invention may be viewed. The inboard screws (12), packing (9) and rotary drive end (11) have been removed. FIG. 6 illustrates, by way of example only, the rotary seal face assembly (6), in particular the metal bellows spring member (37) has been permanently fixed to the radially outwardly protruding section of the sleeve (7). This design is seen to be particularly advantageous when chemical attack is of prime consideration as there are no screws (12) in the process media. Therefore all materials in contact with the process media can be selected in one or more exotic alloy or non-metallic combinations.

A person skilled in the art of mechanical seal design will appreciate that the invention allows many different inboard seal configurations while allowing a mechanical cartridge seal, with no elastomers, to be fitted into a thin cross sectional radial space between the shaft (18) and process chamber (5).

Figure 7:
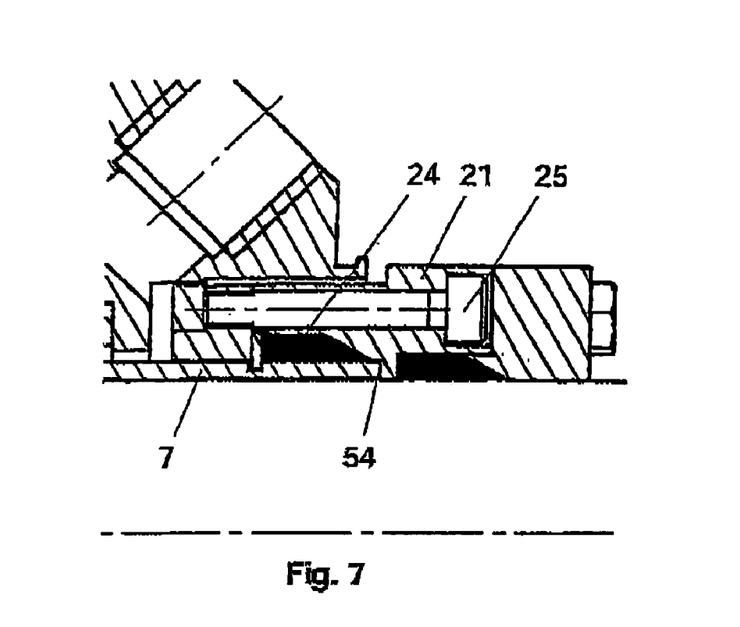
FIG. 7 shows a partial cross section of an alternate arrangement of the invention with a different outboard seal to shaft sealing arrangement without the sleeve supporting member.

It is considered self evident from FIG. 3 that the invention can be offered without the radial lip (29) on drive ring (21) and corresponding recess (30) in sleeve (7). The invention without this supporting feature is shown in FIG. 7. If it is considered appropriate, the sleeve (7) deformation, as the result of radial force exerted by the packing (24) can be minimised by one or a combination of several factors. Such factors may include changing the materials of construction, reducing the squeeze hence force applied on the packing (24) or designing sufficient radial relief in the inner diameter of the sleeve (7) to accommodate the deformation. This principle has been illustrated in FIG. 5 for the inboard side of the sleeve (7) but could also be applied to the outboard side of the sleeve (7) if required.

FIG. 7 also illustrates a design without a positive drive mechanism. The seal drive is transmitted through the metal to metal friction drive (54) by the screws (25) applying a compression load on sleeve (7) and drive ring (21).

Figure 8:
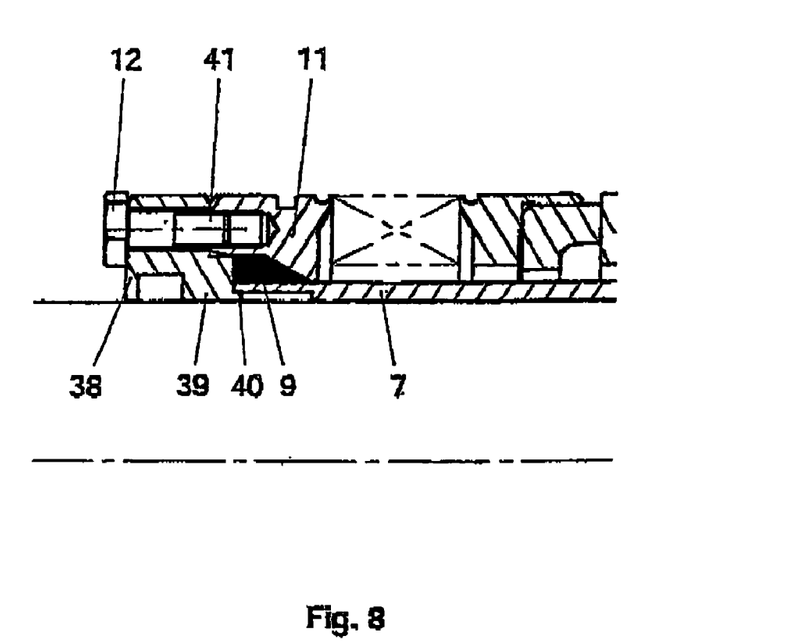
FIG. 8 shows a partial cross section of an alternate arrangement of the invention with an optional inboard sleeve supporting member.

Similarly, FIG. 8 illustrates the inboard end of sleeve (7) with a supporting end cap (38) clamping the sleeve (7) with packing (9) and the rotary seal face drive end (11) using screws (12). Clamp ring (38) has an axially extending lip (39) which radially locates in recess (40) of sleeve (7). This lip (39) supports the end of the sleeve (7) from radially deforming under the force exerted by the packing (9) when compressed. This is particularly important when the cartridge mechanical seal is required to fit into a thin radial cross sectional space.

It has been surprising found that said end cap (38) could be offered in an exotic alloy material for increased chemical resistance. If required a non-elastomeric gasket could be added in between the end cap (38) and drive end (11) in area (41) to protect the sleeve (7) further. This offers a commercial advantage.

Figure 9:
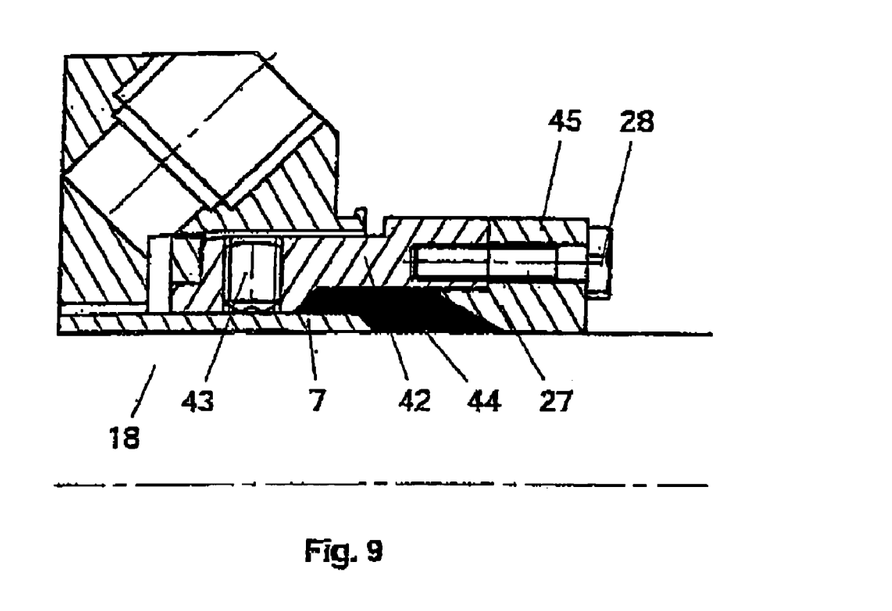
FIG. 9 shows a partial cross section of an alternate arrangement of the invention with a different outboard seal to shaft sealing arrangement.

By way of example only, FIG. 9 shows a partial cross section of an alternate arrangement of the invention with a different outboard seal to shaft sealing arrangement. From FIG. 9 the sleeve (7) terminates in the vicinity of the drive ring (42). The dive ring (42) is secured to the sleeve (7) using radial screws (43). If required an appropriate relief (63) could be included in the sleeve (7). The packing (44) is compressed by the clamp ring (27) using screws (28). When the clamp ring (27) reaches its installed axial position it is secured to the shaft (18) using radial screws (45). The compressed packing (44) forms a leak tight seal between the shaft (18), the sleeve (7), drive ring (42) and clamp ring (27).

Figure 10:
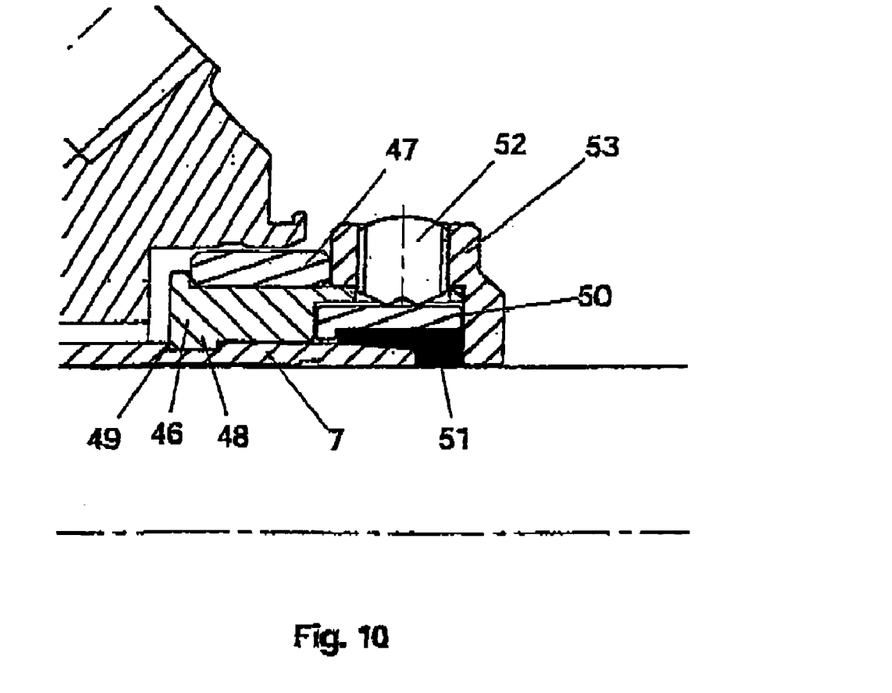
FIG. 10 shows a partial cross section of an alternate arrangement of the invention with a different outboard seal to shaft sealing arrangement.

By way of example only, FIG. 10 shows a partial cross section of an alternate arrangement of the invention with a different outboard seal to shaft sealing arrangement. From FIG. 10 the sleeve (7) terminates in the vicinity of the split drive ring (46). The split drive ring (46) is radially supported by locking collar (47) which extends radially outwardly to the split drive ring (46). This arrangement ensures that the radial inwardly protruding lug (48) in the split drive ring (46) engages in the radial grove (49) in the sleeve (7) and thereby provides axial positioning.

Spacer ring (50) radially engages into the drive ring (46) and acts to compress packing (51) when screws (52) are secured. Screws (52) located in clamp ring (53).

Figure 11:
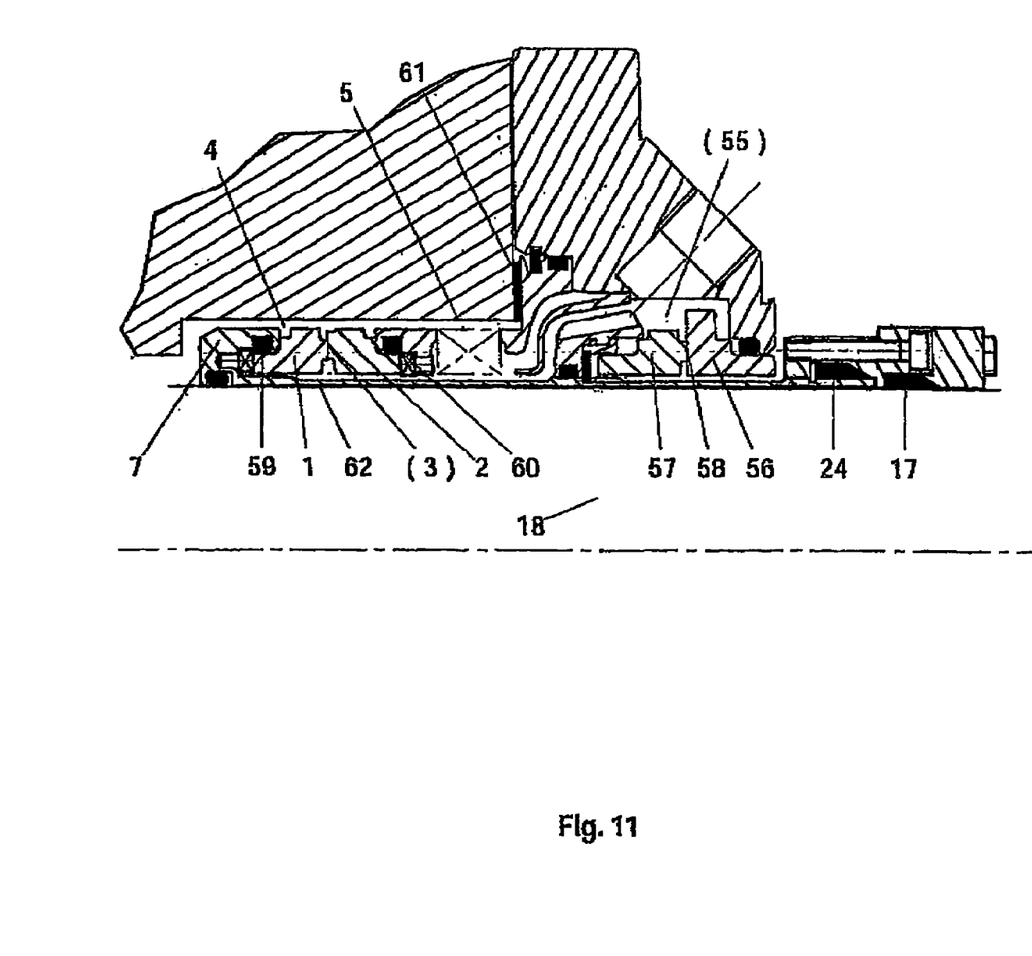
FIG. 11 shows a partial cross section through a double cartridge mechanical seal of the invention.

By way of example only, FIG. 11 illustrates the invention applied to a double cartridge mechanical seal. From FIG. 11 the stationary and axially floating seal face (2) is spring biased towards an axially static rotary seal face (1). The rotary face (1) is allowed to slide on the stationary seal face (2). The interface between the rotary face (1) and stationary seal face (2) forms sealing area (3). This sealing area (3) is the primary seal that prevents the process media (4) from escaping from the process chamber (5).

The second primary seal is made in the barrier media chamber (55) on the outboard side of the mechanical seal. The stationary and axially floating seal face (56) is spring biased towards an axially static rotary seal face (57). The rotary face (57) is allowed to slide on the stationary seal face (56). The interface between the rotary seal face (57) and stationary seal face (56) forms sealing area (58). This sealing area (58) is the primary seal that prevents the barrier media from escaping from the barrier media chamber (55).

Secondary sealing members in contact with the process media include packing members (59, 60 and 61). As described previously, the process media is allowed to travel in the radial gap (62) between the shaft (18) and the sleeve (7). It then is sealed by two further secondary packing members (17 and 24) as described in detail previously.

FIG. 11 clearly illustrates the invention applies to yet another inboard seal configuration. It is therefore clear that the invention can be applied to any arrangement with a very thin radial cross sectional sleeve. For reference the invention could be applied to a sleeve with a radial cross section as small as 0.020" (0.5 mm).

Figure 12:
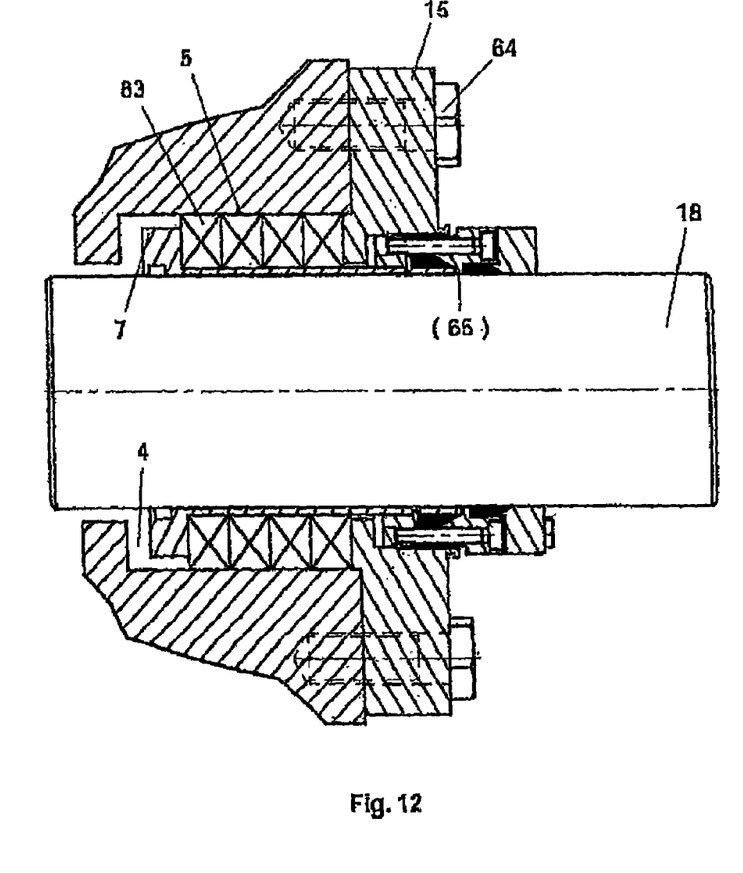
FIG. 12 shows a longitudinal cross section through a non-mechanical seal design.

By way of example only, FIG. 12 illustrates the invention applied to the atmospheric side of a "non-mechanical" design. One or more packing member's (63) are radially outwardly positioned on sleeve (7). The packing member (63) forms a sliding contracting seal between the press chamber (5) and outer radial portion of the sleeve (7). Said packing member's (63) are compressed in position by the gland (15) and bolts (64). This arrangement prevents the process media (4) form escaping from the process chamber (5).

The sleeve (7) to shaft (18) area is sealed by the invention assembly (65) as described previously.

Figure 13:
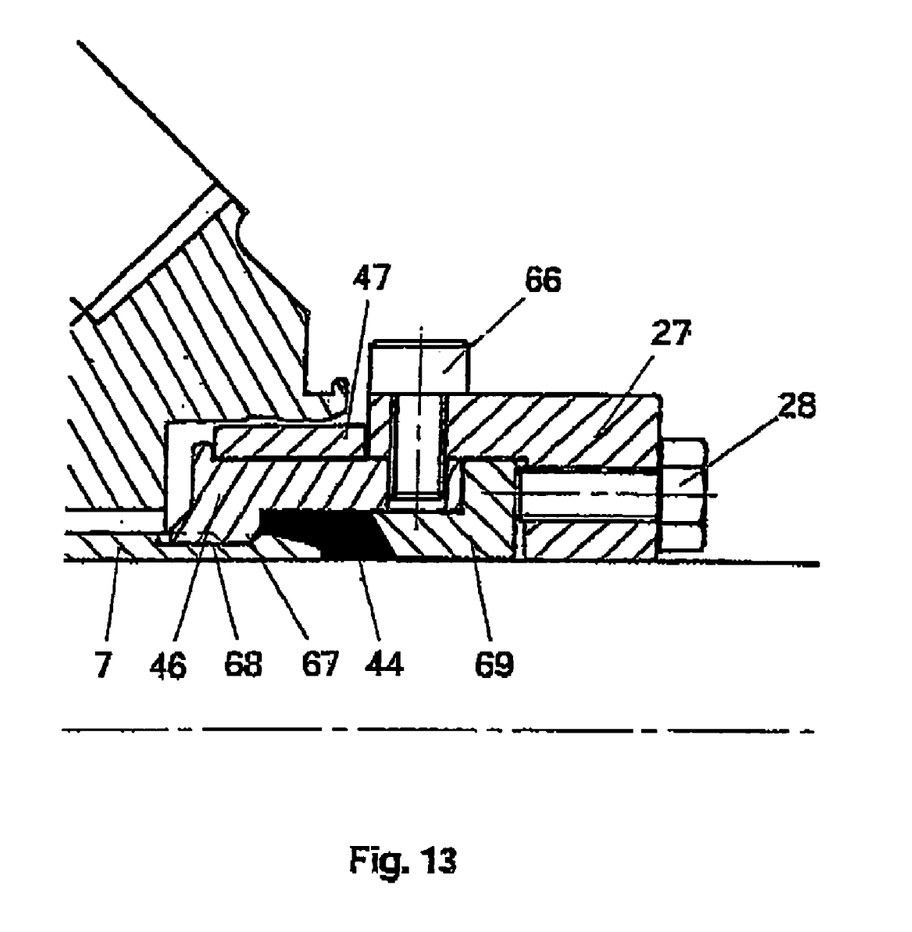
FIG. 13 shows a partial cross section of an alternate arrangement of the invention with a different outboard seal to shaft sealing arrangement.

FIG. 13 illustrates an alternative arrangement of the invention, The split drive ring (46) has a radially inwardly protrusion (67) that locates into a radial recess (67) of sleeve (7). The split drive ring (46) is radially restrained by support ring (47). This arrangement ensures that the protrusion (67) can not disengage from recess (68). The spilt drive ring (46) has an appropriate positive drive mechanism to transmit the rotational drive into the sleeve (7). Radial screws (66) axially connect the split drive ring (46) to clamp ring (27). The process media (4) is sealed when the packing member (44) is compressed by push ring (69) and axial screws (28).

It is considered self evident to the experienced reader that the invention may be employed for both Rotary seals and Stationary seals, single, double or triple mechanical seals, whether designed in a cartridge or component seal format. It is also considered self evident that the invention may be used with metallic components as well as non-metallic components. Some types of equipment rotate the housing and have a stationary shaft. It is considered that the invention can be similarly applied to such designs. The invention may also be applied to a non-mechanical seal design, an example of which is illustrated in FIG. 12.

What is claimed is:

1. A seal that provides sealing between a rotatable shaft and a housing, comprising:
   a stationary part connected to the housing and
   a rotary part for rotation with the shaft, said rotary part comprising a sleeve mounted on the shaft, one end of the sleeve comprising a non-elastomeric sealing arrangement, said sealing arrangement comprising sealing surfaces that contact the outer circumferential surfaces of the sleeve and the shaft and means for effecting sealing engagement between each of said sleeve and said shaft and a respective sealing surface;
   wherein a component of the seal is axially secured to another component of the seal, a first one of said components having an axially extending protrusion which radially locates in an axially extending recess, said first component supporting the other component in the vicinity of a packing member.

2. A seal according to claim 1, wherein the seal is a mechanical seal.

3. A seal according to claim 1, wherein the radial space cross section between the rotatable shaft and housing is at least 0.312" (7.9 mm).

4. A seal according to claim 1, wherein the sleeve is radially supported at one or more points along its axial length.

5. A seal according to claim 1, wherein the sleeve is positively driven at one or more points along its axial length.

6. A seal according to claim 1, wherein a component of the seal has a radially disposed relief directly adjacent to a packing member.

7. A seal according to claim 1, wherein said components comprise different materials.

8. A seal according to claim 1, wherein one component of the seal, located in contact with process media, has a radially disposed groove to accommodate a sacrificial component.

* * * * *